UNITED STATES PATENT OFFICE.

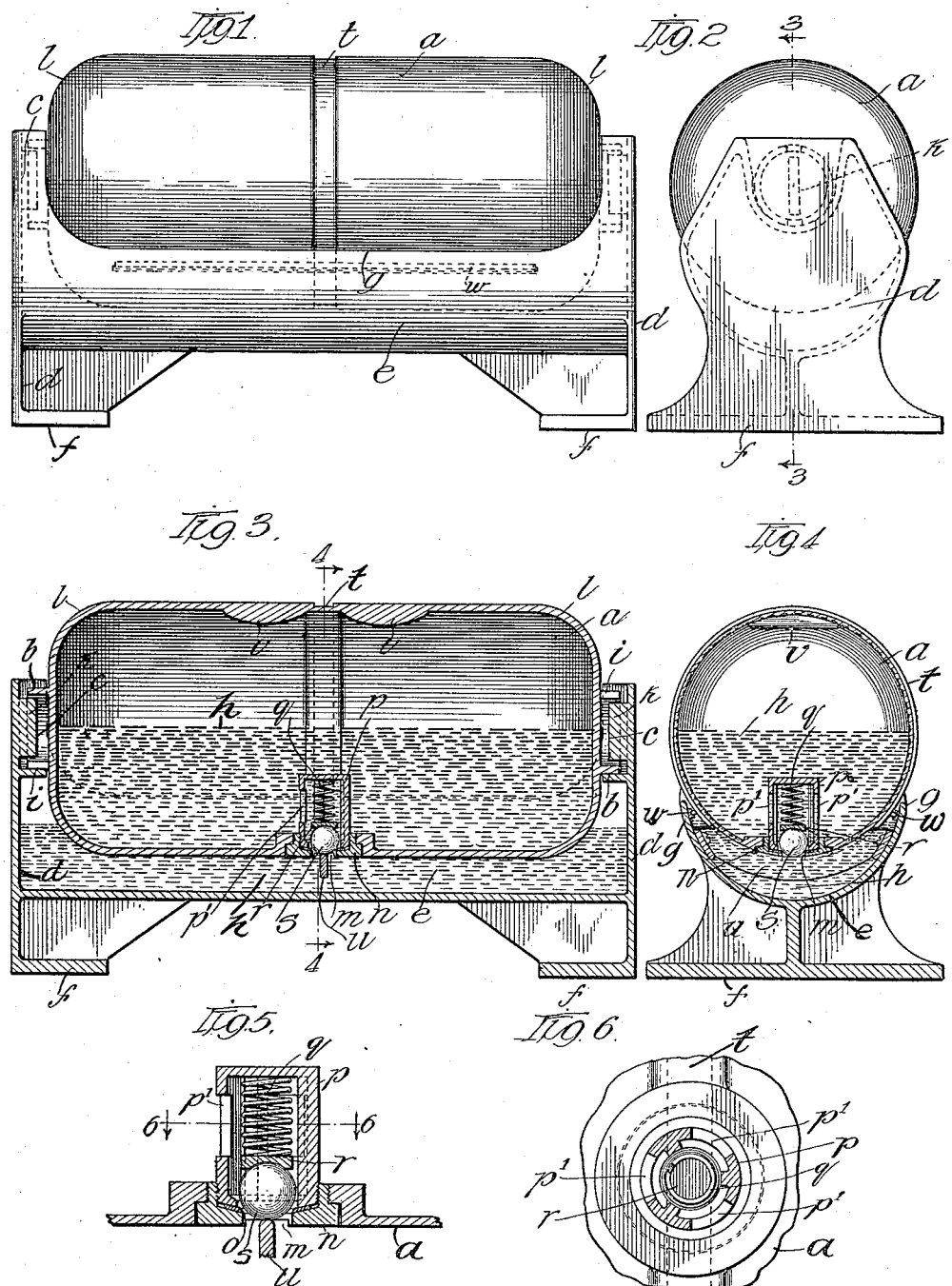

HARRY L. IDE, OF SPRINGFIELD, ILLINOIS.

ANIMAL-EMPLOYED LIQUID-DISTRIBUTER.

1,162,487.

Specification of Letters Patent. Patented Nov. 30, 1915.

Application filed March 20, 1915. Serial No. 15,686.

*To all whom it may concern:*

Be it known that I, HARRY L. IDE, citizen of the United States, residing at Springfield, in the county of Sangamon and State of Illinois, have invented a certain new and useful Improvement in Animal-Employed Liquid-Distributers, of which the following is a full, clear, concise, and exact description, reference being had to the accompanying drawing, forming a part of this specification.

My invention relates to devices which may be operated by animals, such as hogs, to cause such devices to apply suitable oil or other liquid to the skins of animals to rid them of vermin and otherwise contribute to their comfort, a structure of this nature being disclosed in my Patent 1,096,244, dated May 12, 1914 and which prior structure embraces a horizontally mounted roller sufficiently overhanging longitudinal sides of an underlying trough to enable the hog to have such access to the roller as readily to roll it to oil his body without the necessity of climbing upon the device. In the prior structure the trough is further supplied by a reservoir which is so related to the trough as not to interfere with the approach of the animal to the roller at either longitudinal side of the trough, this reservoir being located at one end of the trough. The roller of the prior device is hollow.

It is one of the objects of my present invention either to replace or supplement this reservoir and to this end the roller, when mounted in operative position, is caused to contain an extra supply of liquid, there being facility for permitting the passage of liquid from this roller or container, when in position, to the trough.

As the invention is preferably embodied the animal operated roller projects within the liquid in the trough space and has a discharge opening whose discharge end is brought to a lower position as the roller is turned, to afford a barometric feed, a valve for closing said discharge opening and a valve opener carried by the trough for engaging said valve to establish a passage through the discharge opening, when lowered, whereupon oil or other contained liquid may flow from the roller into the trough if the level of the liquid in the trough is not at a predetermined height, or to the height of the opened valve.

It is another object of my invention to provide means for reducing the liquid film upon the roller to avoid waste of the oil, this means desirably being in the form of a wiper that preferably engages the roller.

I will explain my invention more fully by reference to the accompanying drawing showing the preferred embodiment thereof and in which—

Figure 1 is a side view of the structure; Fig. 2 is an end view; Fig. 3 is a view on line 3 3 of Fig. 2; Fig. 4 is a view on line 4 4 of Fig. 3; Fig. 5 is a view on a larger scale of the valve mechanism as it appears in Fig. 3; and Fig. 6 is a view on line 6 6 of Fig. 5.

Like parts are indicated by similar characters of reference through the different figures.

The horizontally mounted roller $a$ is provided with trunnion projections $b$ at its ends, these projections being substantially co-axial with the roller. The trunnions $b$ are supported by the bottom parts of the insetting pockets $c$ which are formed in the upper extensions of the end walls $d$ of a trough $e$. The trough is provided with a suitable foundation structure $f$. The longitudinal side walls $g$ of the trough $e$ are disposed below the horizontal plane passing through the axis of the roller $a$. The hog thus has opportunity to rub against the lower half of the roller thereby readily to effect its rotation, means being provided for preventing the hog from materially lifting the roller out of the trough and the oil $h$ in the trough as it rapidly revolves the roller. To this end the trunnions are desirably made hollow, a slot $i$ (extending longitudinally of the roller) extending through each trunnion to permit of the passage of insetting vertically elongated or upright lugs $k$ (cast upon the trough structure and extending short distances into the pockets $c$) when the roller is to be mounted within its bearings. The slots $i$ are but a trifle wider than the width of the upright lugs $k$ so that in all positions of the rollers, excepting that which the roller is caused to assume for the purpose of its assembly or removal, the slots $i$ cannot be passed over the lugs $k$ whereby the roller cannot well be dislodged as it is being rapidly turned. The lugs $k$ are sufficiently shorter than the internal diameters of the hollow trunnions $b$ and are so disposed with respect to the pockets $c$ as always to permit limited bodily elevation of the roller, a feature which is of advantage when taken in conjunction with a trough whose liquid holding space completely underlies the axis of rotation of the roller, since any water that may have been caught in the trough cannot, in freezing, burst the machine by the upward pressure which the freezing water would exert upon the roller. The low trough has the additional advantage of having the upper edges of the side walls $g$ thereof sufficiently removed from the hog as ordinarily to prevent it from scraping mud and dirt from its body into the trough, thereby consequently preventing the trough from being chocked. The external surface of the roller itself is smooth, to prevent the roller from scraping dirt from the hog, the smooth surface of the roller also avoiding irritation of the skin. The ends of the cylindrical roller are rounded at $l$, the entire roller thus being of a formation which will enable it, as it is being turned, to transfer oil or other liquid to various portions of the body of the hog, the rounded ends of the roller being particularly adapted to transfer the oil to the ear and shoulder portions of the animal.

I desirably provide but one supplemental source of oil or liquid supply from which the liquid in the trough is replenished and I constitute the roller $a$ itself a container and preferably provide but one opening at $m$ in the roller through which oil may be admitted thereto and discharged therefrom. The roller is thickened in the locality of its opening there to receive a short sleeve $n$ which is screwed into the roller and which supports a dished valve seat $o$ preferably of leather. An elongated sleeve $p$, having ports $p^1$ on its side, is screwed into the bore of sleeve $n$, the outer end of the sleeve clamping the seat $o$ in position. The bore of the sleeve $p$ thus constitutes a valve chamber and a spring $q$ is located in this chamber and serves to press the valve bearing $r$ upon the ball valve $s$ with sufficient force to seat the valve and close the opening at $m$ unless the spring $q$ is sufficiently counteracted in its pressure. The valve $s$ is located in the plane of a peripheral groove $t$ in the roller $a$. A valve opener $u$ is carried by the trough and is also located in the plane of the peripheral groove $t$, this valve opener terminating at the level desired for the oil and conforming to the curvature of the bottom of the groove $t$ between its ends. When the ball valve is seated it projects beyond the bottom of the groove $t$ so that when the roller is turned to bring the ball valve into engagement with the valve opener $u$ the valve will be initially pressed against the force of the spring $q$ and will consequently be opened during the time that the ball valve is between the ends of the valve opener in the turning movement of the roller. The roller is desirably hermetically sealed when the valve is seated, its only possible opening being preferably at the valve so that when the valve is opened below or near the level of the oil, the oil in the container roller $a$ will be fed to the trough barometrically until the level of the oil has again reached the place fixed for it, providing the valve opening $m$ remains in necessary position sufficiently long, a condition which is certain to arise at some time or other. The feeding of oil from the roller to the trough will cease when the level in the trough has reached normal, or when the opened valve is reached, even though the opening at $m$ is still free as is well understood by those familiar with barometric feeding devices.

The oil within the roller $a$ may readily be replenished merely by depressing the valve $s$ against the force of the spring $q$ to permit the oil to be supplied to the roller. The weight of the valve structure added to the roller may be offset by enlarging the roller on the opposite side thereof as indicated at $v$.

While I prefer to employ the barometric feed arrangement and desirably employ the valving mechanism shown, I do not wish to be limited to any particular means for enabling the passage of liquid from the roller, when in position, to the trough, nor do I wish to be limited to the use of a roller as an animal operated means for effecting the movement of the liquid from the trough to an operating animal.

If the film of oil carried up by the roller is too heavy it may be reduced by providing felt wipers $w$ longitudinally margining each longitudinal edge of the trough and positioned to remove a portion of the oil that is upwardly conveyed by the roller correspondingly to reduce the thickness of the oil film and thereby prevent undue waste.

While I have herein shown and particularly described the preferred embodiment of my invention I do not wish to be limited to the precise details of construction shown as changes may readily be made without departing from the spirit of my invention, but—

Having thus described my invention I claim as new and desire to secure by Letters Patent the following:—

1. A device for enabling an animal to apply liquid to its skin including a trough; a liquid container having its exterior supplied with liquid from said trough and accessible for engagement by animals and normally mounted to enable it to be moved with reference to the trough by engaging animals, there being facility for enabling the passage of liquid from said container to the trough, the liquid container being constructed to hold liquid with a level above the liquid in the trough while liquid may flow from the container to the trough; and means for preventing and enabling the flow of liquid from the container, when in position, to the trough.

2. A device for enabling an animal to apply liquid to its skin including a trough; and a liquid container for supplying liquid to the trough and constructed to hold liquid with a level above the liquid in the trough and having its exterior supplied with liquid from said trough and accessible for engagement by animals and normally mounted to enable it to be moved with reference to the trough by engaging animals, said container having a discharge opening constituting a portion of a barometric feed to enable the passage of liquid from the container, when in position, to the trough.

3. A device for enabling an animal to apply liquid to its skin including a trough; a container for holding liquid having its exterior supplied with liquid from said trough and accessible for operative engagement by animals, and normally mounted to enable it to be moved by engaging animals, said container having a discharge opening constituting a portion of a barometric feed to permit the passage of liquid from the container, when in position, to the trough; and a valve for closing said discharge opening and controlled by the movements of the container.

4. A device for enabling an animal to apply liquid to its skin including a trough; a liquid container having its exterior supplied with liquid from said trough and accessible for engagement by animals and normally mounted to enable it to be moved with reference to the trough by engaging animals, said container having a discharge opening for the passage of liquid from the container to the trough, the liquid container being constructed to hold liquid with a level above the liquid in the trough; and a valve for the opening which is accessible for operation while the container is in position to prevent and enable the flow of liquid from the container to the trough.

5. A device for enabling an animal to apply liquid to its skin including a trough; an animal operated hollow roller for holding liquid within its interior and for transferring liquid from the trough to the skin of an operating animal, there being facility for permitting the passage of liquid from the roller to the trough, the roller being constructed to hold liquid with a level above the liquid in the trough while liquid may flow from the container to the trough; and means for preventing and enabling the flow of liquid from the roller, when in position, to the trough.

6. A device for enabling an animal to apply liquid to its skin including a trough; and an animal operated roller projecting within the liquid in the trough space for transferring liquid from the trough to the skin of an operating animal, said roller being hollow to constitute it a container, there being a discharge opening in the roller whose discharge end is brought to a lower position as the roller is turned, to afford a barometric feed.

7. A device for enabling an animal to apply liquid to its skin including a trough; an animal operated roller projecting within the liquid in the trough space for transferring liquid from the trough to the skin of an operating animal, said roller being hollow to constitute it a container, there being a discharge opening in the roller whose discharge end is brought to a lower position as the roller is turned, to afford a barometric feed; and a valve for closing said discharge opening and controlled by the movements of the roller.

8. A device for enabling an animal to apply liquid to its skin including a trough; an animal operated roller projecting within the liquid in the trough space for transferring liquid from the trough to the skin of an operating animal, said roller being hollow to constitute it a container, there being a discharge opening in the roller whose discharge end is brought to a lower position as the roller is turned, to afford a barometric feed; a valve for closing said discharge opening; and a valve opener carried by the trough for engaging said valve to establish passage through the discharge opening, when lowered.

In witness whereof, I hereunto subscribe my name this 16th day of March A. D. 1915.

HARRY L. IDE.

Witnesses:
G. L. CRAGG,
ETTA L. WHITE.